US010528644B1

(12) United States Patent
Zhang et al.

(10) Patent No.: US 10,528,644 B1
(45) Date of Patent: Jan. 7, 2020

(54) ESTIMATION AND VISUALIZATION OF A FULL PROBABILITY DISTRIBUTION FOR CIRCUIT PERFORMANCE OBTAINED WITH MONTE CARLO SIMULATIONS OVER SCALED SIGMA SAMPLING

(71) Applicant: Cadence Design Systems, Inc., San Jose, CA (US)

(72) Inventors: Wangyang Zhang, Allison Park, PA (US); Hongzhou Liu, Sewickley, PA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 243 days.

(21) Appl. No.: 15/638,947

(22) Filed: Jun. 30, 2017

(51) Int. Cl.
*G06F 17/50* (2006.01)
*G06F 17/18* (2006.01)

(52) U.S. Cl.
CPC .......... *G06F 17/18* (2013.01); *G06F 17/5022* (2013.01); *G06F 2217/10* (2013.01)

(58) Field of Classification Search
CPC .. G06F 17/5036; G06F 17/18; G06F 17/5031; G06F 11/008; G06F 17/5009; G06F 17/504; G06F 2217/78; G06F 2217/80; G06F 17/5022; G06F 2217/16
USPC ............... 716/111–113, 132–136; 703/13–14
See application file for complete search history.

(56) References Cited

U.S. PATENT DOCUMENTS 8,806,418 B1 * 8/2014 Jallepalli ............. G06F 17/5022
716/136

9,836,564 B1 * 12/2017 Zhang ................. G06F 17/5022
2007/0198956 A1 * 8/2007 Liu ..................... G06F 17/5036
716/54

OTHER PUBLICATIONS

Zhang et al., Accelerating Monte Carlo Analysis at Advanced Nodes, Jun. 22, 2016, pp. 1-9. (Year: 2016).*
Sheather et al., A Reliable Data-Based Bandwidth Selection Method for Kernel Density Estimation, 1991, Journal of the Royal Statistical Society, vol. 53, Issue 3, pp. 683-690. (Year: 1991).*
Sheather et al., "A Reliable Data-Based Bandwidth Selection Method for Kernel Density Estimation," Journal of the Royal Statistical Society, Series B (Methodological), vol. 53, No. 3, (1991), pp. 683-690.

(Continued)

*Primary Examiner* — Nghia M Doan
(74) *Attorney, Agent, or Firm* — McDermott Will & Emery LLP

(57) ABSTRACT

A method for visualizing a performance distribution of an integrated circuit (IC) design is provided. The method includes determining a yield limit based on a group of Monte Carlo simulations of the IC design, and a functional yield, and selecting an initial yield based on an initial specification value from the group of Monte Carlo simulations. The method also includes selecting additional yield values based on additional specification values and on the group of Monte Carlo simulations of the IC design, wherein the low yield values are estimated using Kernel Density Estimation, and the high yield values are estimated using repeated binary search. The cumulative distribution function and probability density function for a performance of the IC design are estimated based on the additional yield values and the additional specification values. Also, the method includes obtaining a quantile representation for the performance of the IC design from the cumulative distribution function.

20 Claims, 12 Drawing Sheets

(56) References Cited

OTHER PUBLICATIONS

Sun et al., "Fast Statistical Analysis of Rare Circuit Failure Events via Scaled-Sigma Sampling for High-Dimensional Variation Space," IEEE Transactions on Computer-Aided Design of Integrated Circuits and Systems, vol. 34, No. 7, Jul. 2015, pp. 1096-1109.

* cited by examiner

ESTIMATION AND VISUALIZATION OF A FULL PROBABILITY DISTRIBUTION FOR CIRCUIT PERFORMANCE OBTAINED WITH MONTE CARLO SIMULATIONS OVER SCALED SIGMA SAMPLING

TECHNICAL FIELD

Embodiments described herein are generally related to the field of circuit simulation for integrated circuit (IC) design and fabrication. More specifically, embodiments described herein are related to visualization and display of a performance distribution for an IC design using a limited number of Monte Carlo (MC) simulations.

BACKGROUND

In integrated circuit (IC) design, preforming an accurate statistical analysis of rare circuit failure events typically involves lengthy calculations performed over large samples of a multiple dimensional parameter space. The statistical analysis typically involves MC simulations of the IC design using normalized distributions for each of a plurality of random variables involved in IC fabrication according to a foundry where the IC is fabricated. The problem of obtaining accurate statistical samples becomes more acute for high yield estimation of IC designs. To increase the accuracy of a statistical model, current solutions commonly increase the size of the sample set for MC simulations, thereby creating a bottleneck for turnaround time in the design process.

It is desirable to develop a method and a strategy to reduce the size of the sample set for MC simulations, while at the same time obtaining equal or better accuracy for the performance of an IC design.

The description provided in the background section should not be assumed prior art merely because it is mentioned in or associated with the background section. The background section may include information that describes one or more aspects of the subject technology.

SUMMARY

In a first embodiment, a computer-implemented method for visualizing a performance distribution of an integrated circuit (IC) design is disclosed that includes determining a yield limit based on a group of Monte Carlo simulations of the IC design, and a functional yield. The computer-implemented method also includes selecting an initial yield value based on an initial specification value from the group of Monte Carlo simulations, and selecting an additional yield value based on an additional specification value and on the group of Monte Carlo simulations of the IC design. The additional yield value is larger than the initial yield value and lower than the yield limit. The computer-implemented method includes obtaining a cumulative distribution function for a performance of the IC design based on the additional yield value and the additional specification value, and generating a quantile representation for the performance of the IC design from the cumulative density function.

In a second embodiment, a system is disclosed that includes a memory storing instructions, and at least one processor that executes the instructions to determine a yield limit based on a group of Monte Carlo simulations of an IC design, and a functional yield, to select an initial yield value based on an initial specification value from the group of Monte Carlo simulations, and to select an additional yield value based on an additional specification value and on the group of Monte Carlo simulations of the IC design. The additional yield value is larger than the initial yield value and lower than the yield limit. The at least one processor further executes instructions to obtain a cumulative density function for a performance of the IC design based on the additional yield value and the additional specification value and to generate a quantile representation for the performance of the IC design from the cumulative density function.

In yet another embodiment, a non-transitory, machine-readable storage medium is disclosed that includes machine-readable instructions for causing a processor to execute a method including determining a yield limit based on a group of Monte Carlo simulations of an IC design, and a functional yield, selecting an initial yield value based on an initial specification value from the group of Monte Carlo simulations, and selecting an additional yield value based on an additional specification value and on the group of Monte Carlo simulations of the IC design. The additional yield value is larger than the initial yield value and lower than the yield limit. The method also includes obtaining a cumulative density function for a performance of the IC design based on the additional yield value and the additional specification value, and generating a quantile representation for the performance of the IC design from the cumulative density function.

In a further embodiment, a system is disclosed that includes a means for storing computer code and a means to execute the computer code to perform steps to determine a yield limit based on a group of Monte Carlo simulations of an IC design, and a functional yield, to select an initial yield value based on an initial specification value from the group of Monte Carlo simulations, and to select an additional yield value based on an additional specification value and on the group of Monte Carlo simulations of the IC design. The additional yield value is larger than the initial yield value and lower than the yield limit. The means to execute the computer code further executes computer code to obtain a cumulative density function for a performance of the IC design based on the additional yield value and the additional specification value and to generate a quantile representation for the performance of the IC design from the cumulative density function.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

Figure 1:
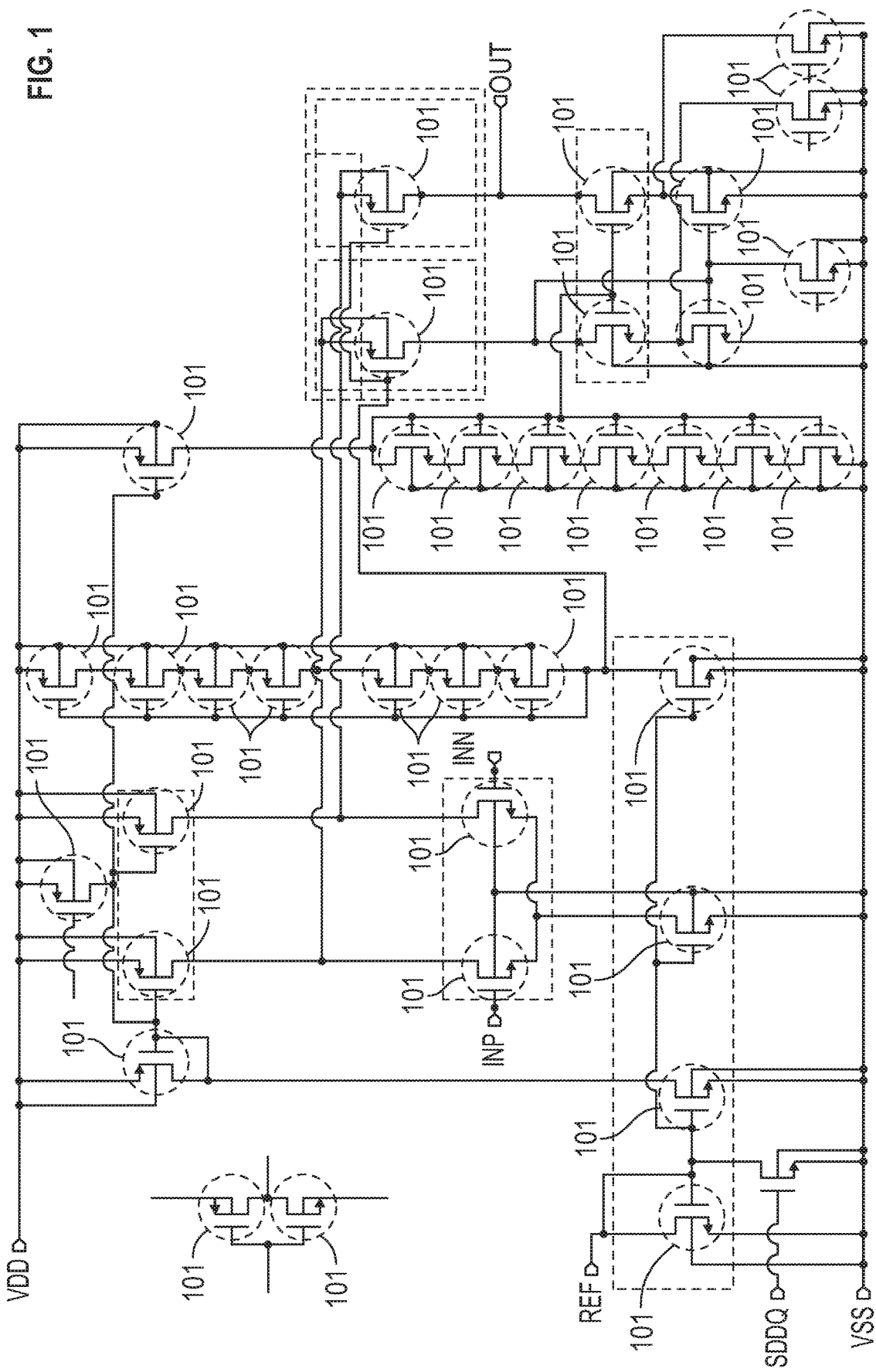
FIG. 1 illustrates a schematic of an IC design according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides a method for estimating and visualizing a full probability distribution for IC design performance using a limited number of MC simulations to reduce computational costs and turn-around time for modeling and simulating an IC design.

The disclosed system addresses a technical problem tied to computer technology and arising in the realm of computer networks, namely the technical problem of associating a circuit yield for an IC design with a specification target for the IC performance, e.g., a desired specification value such as a bandwidth, a gain, an operating current, and the like. The disclosed system solves this problem by performing a limited amount of post-processing MC simulations over a scaled-sigma sampling (SSS), and by providing an intuitive visualization of the results as full probability density functions (PDFs), cumulative density functions (CDFs) or quantile plots (Q-plots) of the specification value.

Embodiments consistent with the present disclosure may be used by circuit designers to decide whether an IC design may be further optimized, or if a specification target (e.g., gain >60 dB, or delay <100 ps, and the like) may be adjusted to a new sigma value for manufacturing yield. Further, some embodiments provide a flow to estimate the PDF and CDF of the output using kernel density estimation and a binary search to create a "map" of yield versus specification values.

Some attempts to solve the above problem of statistical sampling include running a very large (e.g., 1 billion) MC sampling routine to extract the 0 to 6 sigma quantile points (hereinafter, referred to as 6 "$\sigma Q$"). However, such approach may be highly time-consuming. Other approaches may be limited in their ability to reuse MC simulations to estimate the yield of a different target (e.g., a different specification of the IC design, such as bandwidth, gain, operating current, and the like). Further, some approaches may only accurately estimate the yield associated with a pre-defined maximum number of MC samples. For example, in some embodiments, $10^9$ MC samples may be selected for modeling a 6 $\sigma Q$ yield, and $10^5$ MC samples may be selected for achieving a 4 $\sigma Q$ yield. However, embodiments as disclosed herein may not constrain the number of MC samples a priori, such that, in some instances, a 6 $\sigma Q$ may be found with much fewer than $10^9$ MC samples, thereby reducing substantially the computational cost of the IC analysis.

Embodiments as disclosed herein provide a solution to the problem of characterizing a full output distribution for an IC design, which is rooted in computer technology, as the performance of a computer may be greatly enhanced from the reduced computational burdens on processing time. Further, embodiments as disclosed herein enhance the performance of a computer by providing an intuitive display of results, enabling a user to more easily grasp the quality and yield of an IC design, thereby reducing substantially design turnaround time.

FIG. 1 illustrates a schematic of an IC design according to some embodiments. IC design 100 may include a netlist having a plurality of circuit components 101. Without limitation, IC design 100 may include an operational amplifier including metal-oxide-semiconductor field effect transistor (MOSFET) as circuit components 101-1 through 101-10 (hereinafter, collectively referred to as "components 101"). In general, components 101 may include N-type MOS (NMOS) transistors, P-type MOS transistors (PMOS), resistors, capacitors, inductors, and the like. Some of the specifications that may be relevant for IC design 100 may include, without limitation, an operational current, a unit gain frequency (UGF), a gain value (which may be a function of frequency and/or load), a random offset (e.g., voltage turn-on), an operating bandwidth, a turn-on voltage, and a power consumption. Accordingly, a user may be interested in modeling IC design 100 according to the highest current that the design may draw, the lowest UGF that it may provide, lowest gain, and the largest random offset that may result under a wide range of operational configurations.

For each component 101, the foundry may provide a set of random variables and a model that predicts component values as a function of the random variables (also referred to as "process variables" and "mismatch variables"). The foundry may further provide a statistical distribution (e.g., a normal distribution, a Poisson distribution, and the like) for each of the random variables, including a mean value and a standard deviation, targeting operational values of circuit component 101 (e.g., a threshold voltage for a transistor, $V_{th}$). Such information is provided by the foundry in the form of a process development kit (PDK), which is a library including text files that may express, e.g., the threshold voltage for an NMOS transistor, $m_1$, $V_{th}(m_1)$ as:

$$V_{th}(m_1)=0.3+0.01 \cdot x_1+0.03 \; x_2+0.02 \cdot x_3 \quad (1.1)$$

where $x_1$, $x_2$, and $x_3$ are random variables associated with NMOS transistor $m_1$. For statistical PDKs, the random variables ($x_1, x_2, \ldots x_M$) are typically modeled as a Normal distribution with fixed mean and standard deviation:

$$x_j \sim N(\mu_j, \sigma_j^2) \quad (1.2)$$

An expression like Eqs. 1.1 and 1.2 is determined after performing a large number of experiments on multiple CMOS transistors fabricated by the foundry. In general, each circuit component 101 may have a number of random variables, $x_j$, associated with it, and each operational value may be associated to the random variables, $x_1$, by an expression similar to Eqs. 1.1 and 1.2. In some embodiments, the number of random variables and the expression for the operational values in Eqs. 1.1 and 1.2 may depend on the type of circuit component being considered (e.g., NMOS transistor, PMOS transistor, resistor, and the like). More generally, the set of random variables $x_1$, $x_2$, and $x_3$ may be designated by a vector, x, such as $x=(x_1, x_2, x_3)$. Hereinafter, reference to a specific collection, j, of the multiple values for all random variables in the PDK will be made as "sample vector $x_j$" (e.g., with a vector notation in bold).

Further, in some embodiments, expressions such as Eqs. 1.1 and 1.2 may be found in the PDK for all operational parameters of components 101, such that a MC simulation can be carried out for the entire IC design 100 using selected values for random variables $(x_1, x_2, \ldots x_M)$. Accordingly, a specification, v, may be found, which is associated to the selected values: $v=v(x_1, x_2, \ldots x_M)$.

Each of components 101 may be described by size features that have a direct impact on the component performance and an overall impact on the performance of the IC design. For example, some of these parameters (e.g., in the case of a MOSFET) may include an area, a channel width, or a channel length. The user configures IC design 100 to satisfy desired specification targets, which may be defined by the user according to an application intended for IC design 100. To estimate a foundry yield for IC design 100, a user may include random variables $x_j$, constrained by expressions such as Eqs. 1.1 and 1.2 in methods as disclosed herein, perform an IC simulation, and determine whether or not the resulting specification, v(x), satisfies a performance criterion defined by a target parameter, $v_t$ (e.g., $v_t<v$, $v<v_t$, and the like).

Accordingly, it is desirable to know a statistical distribution, e.g., a probability density function (PDF) to determine the manufacturing yield for the specific IC design given a certain value of a target parameter, $v_t$, for specification, v. In some embodiments, the statistical distribution may be a cumulative distribution function (CDF) which is an integral of the PDF over the target parameter $v_t$. In some embodiments, the statistical distribution may be a quantile distribution, wherein the target parameter, $v_t$, is plotted as a function of the yield resulting from $v_t$. In some embodiments, the yield in a quantile plot may be expressed in terms of standard deviations (a) of the PDF for the target parameter, $v_t$.

For high yield specifications, given a distribution of random samples, $\{x\}_i$, it is expected that most, if not all, of the performance values simulated under MC, $\{v(x)\}_i$, will pass the performance criterion, thereby hindering an accurate yield estimation for the IC design under such specifications, unless a large number of MC samples $\{x\}_i$ are simulated. To mitigate the use of large MC sampling, some embodiments include an SSS technique, as follows.

In some embodiments, an SSS technique may be used to estimate a yield of an IC design for a pre-selected specification. For example, and without limitation, when the specification is to design an amplifier IC with a minimum gain, $v_{gain\_min}$, an SSS technique may be used to estimate the percentage of manufactured ICs under a given IC design that will satisfy $v_{gain-min}<V_{gain}$.

In some embodiments, an SSS technique may be used to estimate a specification corner that satisfies a given target yield. In the above example, without limitation, when a target yield of, say, 99.99% is desired for the manufacture of the amplifier IC according to the IC design, an SSS technique may be used to estimate the minimum gain, $v_{gain-min}$, that may be demanded of such IC design. In fact, many users of IC design tool may fall within this category and not have a firm specification target when running high yield estimation, and yet may have a clear desire for a manufacturing yield.

Further, embodiments disclosed herein provide a visualization of the relationship between manufacturing yield and a value for a selected specification. Thus, a user may clearly identify target specification values, production costs, and IC design turnaround, as desired.

Figure 2:
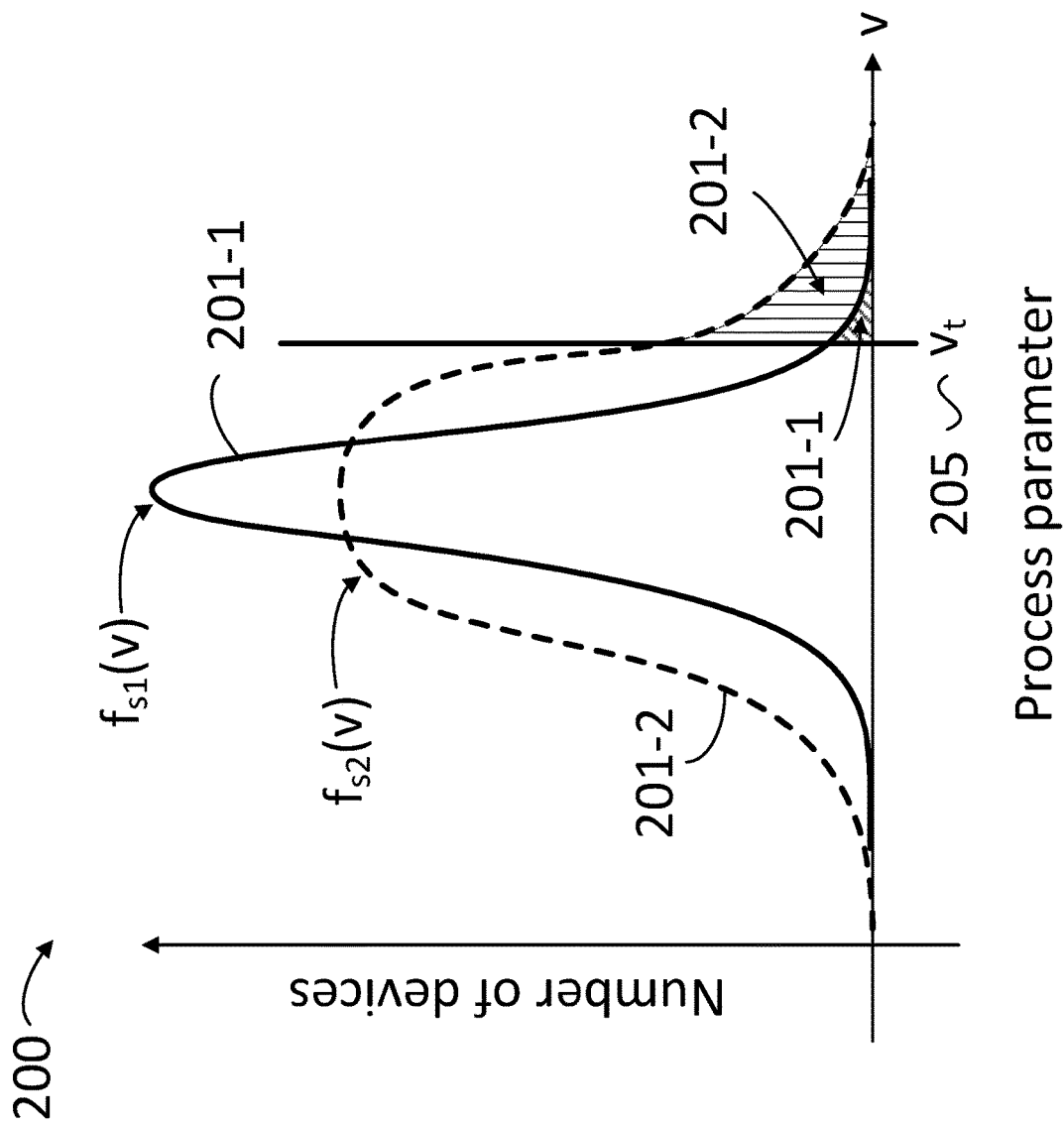
FIG. 2 illustrates probability distributions as a function of specifications for two scaling factors, according to some embodiments.

FIG. 2 illustrates probability distributions 201-1 and 201-2 (hereinafter, collectively referred to as "distributions 201") as a function of specification, v, for two scaling factors respectively ($s_1$ and $s_2$), according to some embodiments. More specifically, probability distributions 201 may be probability density functions, f(v), whose integral over an interval $\Delta v$ indicates the probability of finding a manufactured IC having a specification v within the interval $\Delta v$. Without limitation, and for illustration purposes only, it may be assumed that $s_1<s_2$ (e.g., $s_1=1$, and $s_2=2$).

Note that, while individual component parameters may be functionally expressed in terms of one or more random variables, $x_i$, and the probability distribution of random variables $x_i$ may be known (cf. Eqs. 1.1 and 1.2), it is not trivial to find functions $f_{s_1}$ and $f_{s_2}$, which depend on the resulting specification, v, of the IC design. The resulting specification, v, of the IC design is a non-trivial random function of all, or most of all, of the random variables, $x_i$, in the IC design.

Accordingly, the SSS technique for $f_{s_1}$ or $f_{s_2}$ includes performing MC simulations using Eq. 1.1 over sample sets $\{x_1\}_i$ or $\{x_2\}_i$ wherein the random variables $\{x_1\}_i$ or $\{x_2\}_i$ are defined by a normal distribution having a scaled standard deviation $$x_i \sim N(\mu_i, s_1 \cdot \sigma_1^2) \tag{1.3}$$

As the difference between distributions 201 illustrates, in some embodiments the greater the scaling factor in Eq. 1.3, the resulting distribution fs(v) will be broader, leading to a higher failure rate, $P(v_t)$, of the manufactured IC for a given specification, $v_t$. In that regard, the failure rate $P_1(v_t)$ may be defined as the ratio of an area 211-1 to the area under distribution 201-1. Likewise, the failure rate $P_2(v_t)$ may be defined as the ratio of an area 211-2 to an area under distribution 201-2. Accordingly, $P_1(v_t)<P_2(v_t)$. Hereinafter, areas 211-1 and 211-2 will be referred to, collectively, as failure regions ($\Omega p$) 211.

The SSS technique includes scaling up the variance of random variables $\{x\}$ for a given MC sample to increase the probability of obtaining at least one or more MC results in failure region 211. Accordingly, by using a model of the failure rate P as a function of the scaling factor, s, the SS technique may extrapolate the model to the value, s=1, and thereby reach a value for the 'true' failure rate, P, expected from the IC design.

Figure 3:
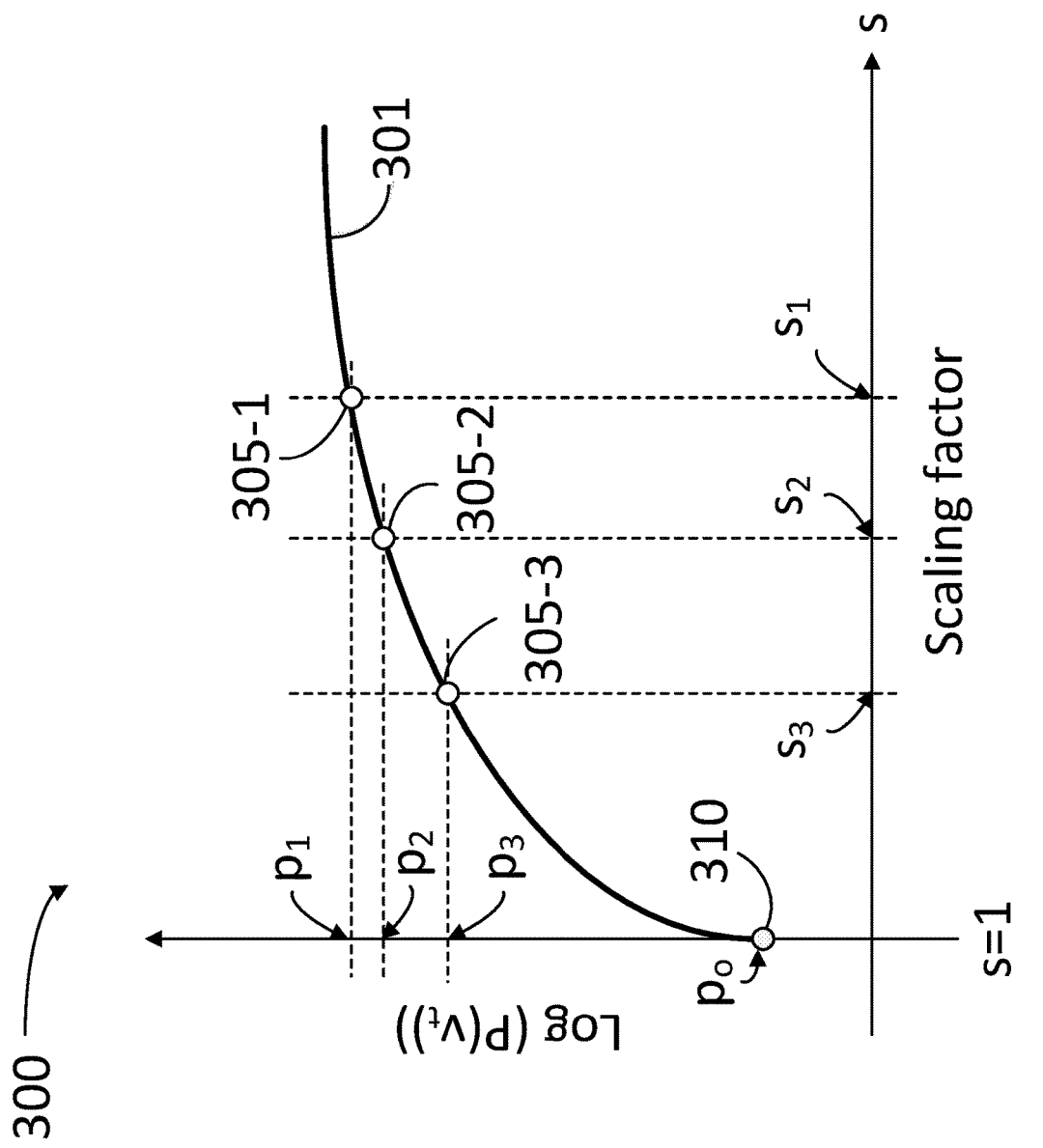
FIG. 3 illustrates a failure rate model as a function of the scaling factor, according to some embodiments.

FIG. 3 illustrates a failure rate model as a function of the scaling factor, s, $P(v_t, s)$, according to some embodiments. Note that the failure rate is defined according to a target specification, vt (e.g., target specification 205). In some embodiments, $P(v_t, s)$, may be modeled using the above function of s.

$$\log(P(v_t, s)) \approx \alpha + \beta \log(s) + \frac{\gamma}{s^2} \qquad (2)$$

Wherein model coefficients (e.g., α, β, γ) encode dimensional information. Accordingly, in some embodiments an SSS technique includes performing a limited number of MC simulations using multiple scaling factors $\{s_i = s_1, s_2, s_3\}$ to obtain failure rates $\{p_i = p_1, p_2, p_3\}$ and form multiple points 305-1, 305-2, 305-3 (hereinafter, collectively referred to as points 305) and more, if desired. Coefficients α, β, and γ may thus be obtained by fitting Eq. 2 to points 305.

The model in Eq. 2 imposes few constraints on failure region 211, and can target multiple failure regions, e.g., for more than one performance parameter, such as gain and bandwidth, power, and current. When the function P is efficiently estimated (typically for large s), after fitting model, the actual failure rate, $p_o$, of the IC model is obtained by setting, s=1, in Eq. 3 to obtain point 310:

$$P(vt, s=1) = \exp(\alpha + \gamma) \qquad (3)$$

Note that, while Eq. 3 gives the value of the 'true' failure rate, P, of the IC design, the value of the specification, vt, associated with the failure rate, P, is pre-selected to obtain failure rates $p_1$, $p_2$ and $p_3$ for points 305. The yield may be determined as 1-P, wherein P is obtained with the SSS technique (e.g., Eq. 3).

Some embodiments include a corner creation process for the specification, v, as an inverse problem of SSS. Accordingly, in some embodiments the user pre-selects a target yield (or failure rate, P) for an IC design and desires to determine a specification target for specification, vt, corresponding to the pre-selected yield. For example, the user may desire to determine a minimum gain specification for a given amplifier circuit design that results in a manufacturing yield of 99.99%. Accordingly, some embodiments include iteratively applying the SSS technique with suitably selected target parameter values, $vt_1$, $vt_2$, . . . (and so on), until a target parameter value, $v_t$, is found to satisfy the specified yield (or failure rate, Pt).

More generally, it is desirable to obtain a statistical distribution, f(v), for circuit performance, as a function of specification value, v, in a closed, analytic expression. This may reduce costly iteration steps involving multiple MC simulations. Having a closed, analytic expression for f(v), a derivation of the yield and failure rate as a function of a target parameter, $v_t$, involves a simple integration process, such as:

$$P = \int_{vt}^{\infty} f(s) \cdot ds \qquad (4)$$

Wherein the IC failure criterion is assumed to be, without limitation, $v_t < v$ (the limits in the integral of Eq. 4 would be changed to $(-\infty, v_t)$ if the criterion is the reverse).

Figure 4B:
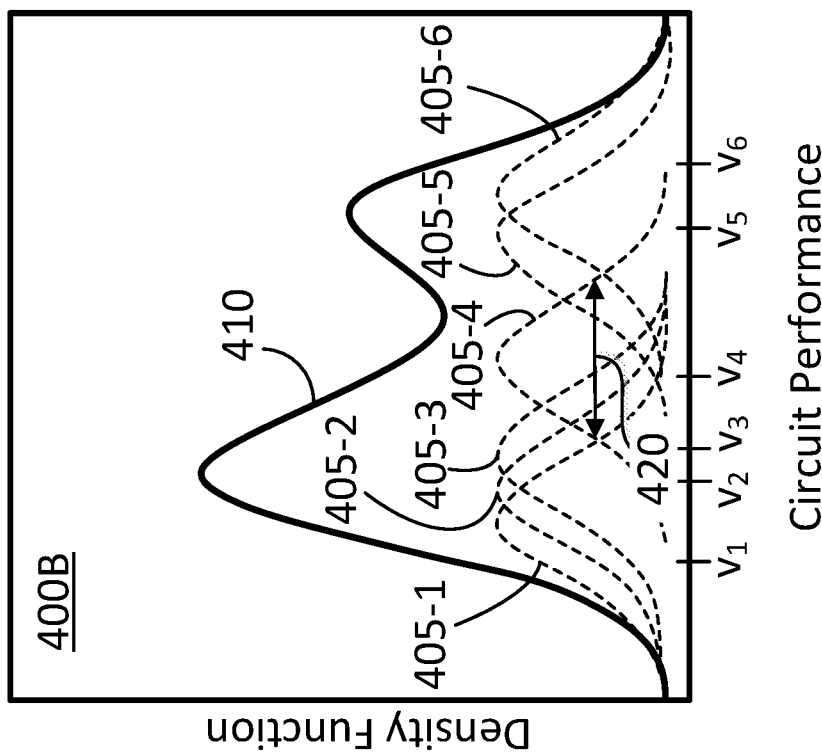
FIGS. 4A-B illustrate kernel density plots of circuit performance, according to some embodiments.
Figure 4A:
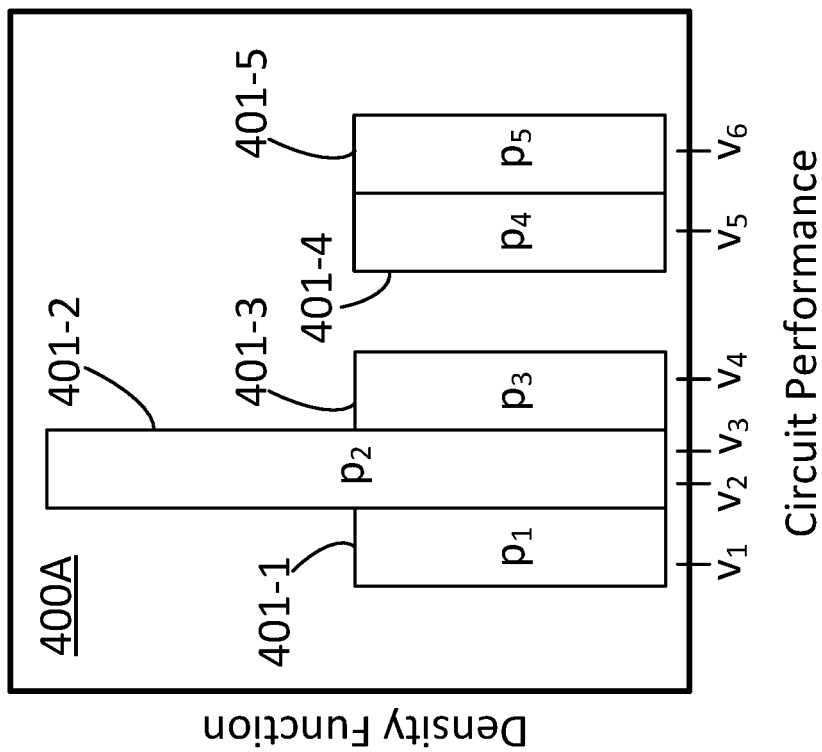

FIGS. 4A-B illustrate kernel density plots 400A and 400B, respectively (hereinafter, collectively referred to as "plots 400"), obtained as functions of specification, v (in the abscissae of plots 400), for circuit performance, according to some embodiments. The abscissae in plots 400 may include multiple specifications, $\{v_i\}$, obtained using an MC simulation over a sample set $\{x\}_i$, where each sample vector x is denoted by index "i," running from 1 to N (e.g., in an SSS technique, for the case s=1). Note that each entry 'i' in vector, v, corresponds to a complete data sample x, in set $\{x\}_i$, wherein the data sample x has the dimension, M, of the total random variable space for the IC design (cf. Eqs. 1). In some embodiments, the MC simulation includes data obtained in the execution of an SSS technique as described above.

Plot 400A includes values 401-1, 401-2, 401-3, 401-4, and 401-5 (hereinafter, collectively referred to as "values 401"). Values 401 may include a histogram obtained by binning specifications, $\{v\}_i$, accordingly. Note that, without limitation and for illustrative purposes only, plot 400A includes five values 401 for six different specification values $\{v_1, v_2, v_3, v_4, v_5,$ and $v_6\}$.

Given N samples $(v_1, v_2, \ldots, v_N$, e.g., N=6 in plot 400A) from the, s=1, MC simulation in an SSS technique as described above, a statistical distribution, f(v), may be a PDF estimated as follows $$f(v) = \frac{1}{N \cdot h} \sum_{i=1}^{N} K\left(\frac{v - v_i}{h}\right) \qquad (5)$$

where K(•) is a kernel function and h is a bandwidth 420. Plot 400B includes Kernel density curve 410, which illustrates an example PDF function obtained from Eq. 5 and values 401. In some embodiments, kernel function, K(•), may be selected as normal distribution $$K(u) = \frac{1}{\sqrt{2\pi}} e^{-\frac{1}{2}u^2} \qquad (6)$$

Accordingly, each of curves 405-1 through 405-6 (hereinafter collectively referred to as "curves 405") may follow a functional expression as given by Eq. 6, with $u = (v - v_i)/h$.

In some embodiments, a statistical distribution may be obtained as a CDF by integrating the PDF in Eq. 6 to obtain $$cdf(v) = \frac{1}{2N} \sum_{i=1}^{N} \left(1 + erf\left(\frac{v - v_i}{h\sqrt{2}}\right)\right) \qquad (7.1)$$

where erf(•) is the error function.

More generally, a CDF may be obtained from f(v), when f(v) is a PDF, as follows:

$$cdf(v) = \int_{-\infty}^{v} f(u) \cdot du \qquad (7.2)$$

Conversely, in some embodiments a PDF may be obtained from f(v), when f(v) is a CDF, as follows $$pdf(v) = \frac{df(u)}{du}\bigg|_{u=v} \qquad (7.3)$$

Some embodiments include a step for determining the bandwidth of the kernel, h (cf. Eq. 6), from the MC simulation data (e.g., as obtained in the SSS technique). In some embodiments, an asymptotically "optimal" h can be estimated as:

$$h_{opt} = \left( \frac{R(K)}{\mu_2(K)^2 R(f'')N} \right)^{1/5} \quad (8)$$

where $$R(g)=\int g(x)^2 dx, \mu_2(g)=\int x^2 g(x)dx$$

and f" is the second derivative of the PDF (cf. Eq. 5). Note that, in general, the Kernel, K, and PDF, f, are functions parametrized by bandwidth, $h_{ops}$ (cf. Eqs. 5-7). Accordingly, some embodiments include solving for $h_{opt}$ from Eq. 8, which may not be a trivial matter.

A curve 410 obtained through a KDE distribution estimates the yield (or the failure rate, P(v)) more reliably when the specification value, v, is within 2-3 standard deviations from the mean in the distribution $\{v_i\}$ obtained for the, s=1, MC samples, than for values of v outside of this range (e.g., 6 σQ). Accordingly, methods and systems consistent with the present disclosure include further steps to improve the accuracy of a yield or failure rate, as a function of specification, v, when this is more than 2 or 3 standard deviations away from the mean associated with a given IC design.

Figure 5B:
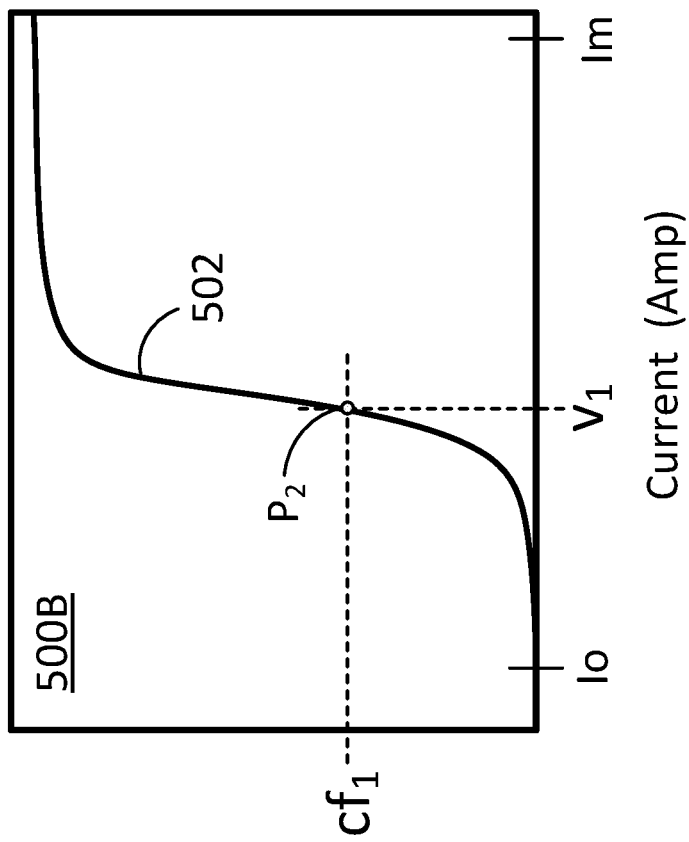
FIGS. 5A-B illustrate a probability density function (PDF), and a map of a cumulative density function (CDF), according to some embodiments.
Figure 5A:
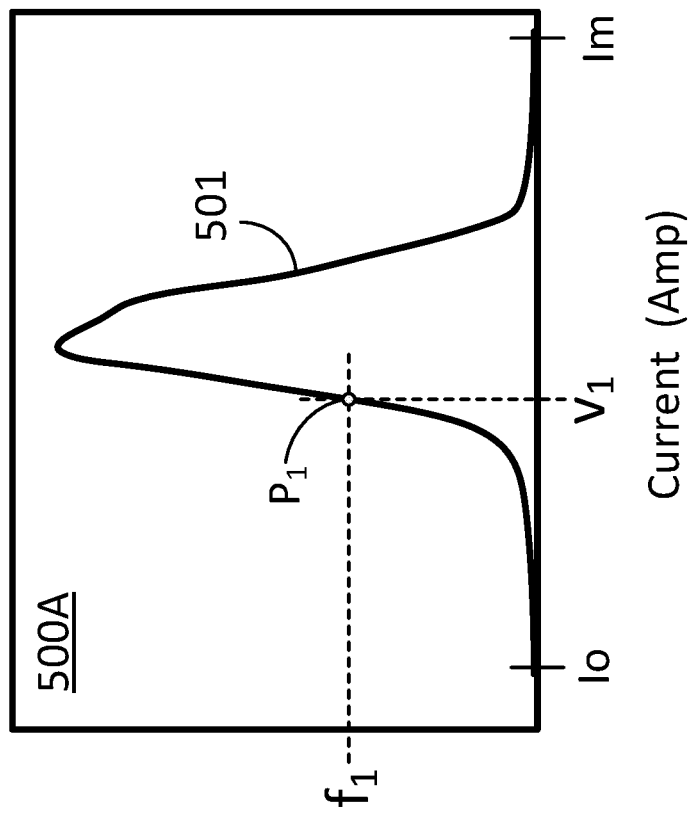

FIGS. 5A-B illustrate chart 500A with a PDF 501, and a chart 500B with a map of a CDF 502, obtained according to some embodiments. Without limitation, the IC design for charts 500A, 500B, (hereinafter, collectively referred to as "charts 500") is an operational amplifier (e.g., for a 45 nm channel length technology), and specification, v, in the abscissae of charts 500A and 500B corresponds to a current output. Accordingly, the current output in the IC design may have values ranging from a minimum current, Io (e.g., 6.985 mA), to a maximum current, Im (e.g., 7.015 mA).

Embodiments as disclosed herein include building PDF 501 by applying methods including an SSS technique and KDE estimation as described above, to find points (e.g., point $P_1$). Point $P_1$ includes an abscissa, v1, corresponding to a value for the specification (e.g., current for PDF 501), and an ordinate, f1, corresponding to a probability density that a manufactured IC from the IC design will operate at the specification value, v1.

Likewise, some embodiments as disclosed herein include building CDF 502 by applying methods including an SSS technique and KDE estimation as described above, to find points (e.g., point $P_2$). Point $P_2$ includes an abscissa, y1, corresponding to a value for the specification (e.g., current for CDF 502), and an ordinate, $cf_1$, corresponding to a cumulative probability that a manufactured IC from the IC design will operate at the specification value, v≤v1.

In some embodiments, CDF 502 may be obtained from PDF 501 by a simple integration, and PDF 501 may be obtained from CDF 502 by a simple derivation (cf. Eqs. 7.2 and 7.3). Accordingly, a maximum value for CDF 502 may be 1 (e.g., CDF(Im)=1). Moreover, in some embodiments a map of manufacturing yield values as a function of specification values, v, may be obtained by: yield (v)=CDF(v).

Figure 6B:
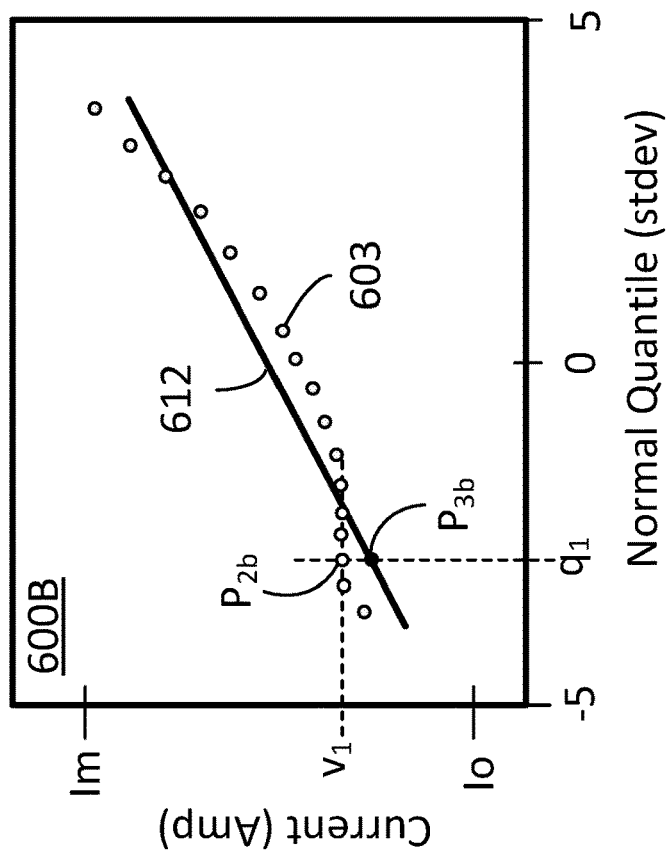
FIGS. 6A-B illustrate a chart comparing a CDF for an IC design with a normal CDF and a quantile plot obtained from the chart, according to some embodiments.
Figure 6A:
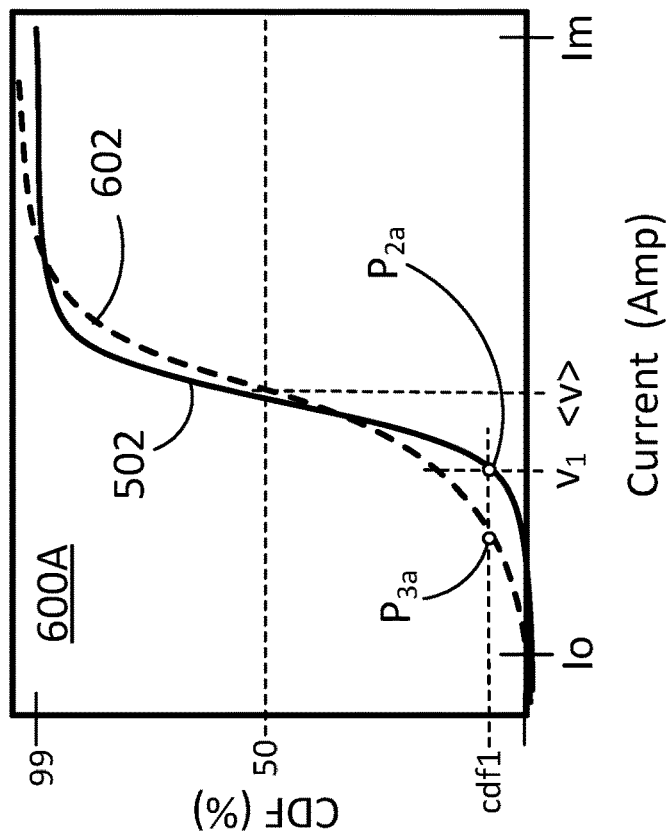

FIGS. 6A-B illustrate a chart 600A comparing CDF 502 with normal CDF 602 and a quantile chart 600B obtained from chart 600A (collectively referred to hereinafter as "charts 600"), according to some embodiments. Accordingly, and for illustrative purposes only, the data in charts 600 is associated with an IC design for an operational amplifier and the specification, v, is the current output. For an IC designer, once an IC design is created, chart 600A may be adequate to illustrate the characteristics of the IC design, and chart 600B may be a valuable visual indication of how the characteristics of the IC design depart from a normal distribution. Indeed, it may be easier to determine deviation of a plot 603 from a linear plot 612 (cf. chart 600B), than it is to compare a nonlinear plot 502 with another nonlinear plot 602 (cf. chart 600A).

Normal CDF 602 is obtained from a normal PDF having a mean $<\{v_i\}>$ equal to the mean of a current output distribution of the IC design for the operational amplifier, $\{v_i\}$, as determined by MC simulations (e.g., using PDF 501). Further, the normal PDF has a standard deviation equal to the standard deviation of the current output distribution of the IC design for the operational amplifier, as above. Accordingly, CDF 602 has a cumulative value of 50% at the mean value, $v=<\{v_i\}>$.

Plots 603 and 612 illustrate the comparison between CDF 502 and normal CDF 602 using the Q value extracted from normal CDF 602 as the abscissae. Accordingly, point P2b from plot 603 has abscissae $q_1$, which is the quantile value corresponding to cdf1 of point P3b for normalized CDF 602. The ordinate of point P2b in plot 603 is the value of specification, $v_1$, corresponding to point P2a in CDF 502. Point P2a in CDF 502 has the same ordinate, cdf1, as point P3a in CDF 602.

In some embodiments, rather than a CDF value, it may be desirable to use a quantile value, Q, to express the yield of an IC design. Q is given in standard deviation units, and may be positive, negative or zero. A value Q=0 corresponds to the median of a PDF distribution, that is, a 50% cumulative yield. In the case of a normal PDF, Q=0 also indicates the average of the PDF distribution. A value Q=−5 indicates the yield associated with a specification located five standard deviations to the left of the PDF mean. Accordingly, for a normal PDF, a value Q=−5 corresponds to a yield of about 0.00005%. A value Q=+5 indicates the yield associated with a specification located five standard deviations to the right of the PDF mean. Accordingly, for a normal PDF, a value Q=+5 corresponds to a yield of about 99.99995%.

As illustrated in FIG. 6A, for some values of the operating current, CDF 502 has a higher yield (%) than normal CDF 602, and for other values of operating current CDF 502 has a lower yield (%) than normal CDF 602.

Chart 600B includes a normalized quantile plot 612 for normal CDF 602, wherein the abscissae are the Q values corresponding to the ordinates, which are the specification values, v (e.g., operating current, and the like). Chart 600B also includes plot 603 for the normalized quantile yield of CDF 502.

To form the normalized quantile plot 612, the normal quantile values are obtained from a MC simulation in the SSS technique (e.g., $q=[q_1, \ldots, q_K]^T$). The associated specification values, are $v=[v_1, \ldots v_K]^T$, and a set of linearized normal values, $\{v_{norm}\}$ are obtained using the following expression $$v_{norm}=Q(Q^TQ)^{-1}Q^Tv \quad (9.1)$$

where matrix Q is a matrix construed as [q 1] where 1 stands for a vector whose coordinates are all 1's. For example, if $q=[q_1, q_2, q_3]^T$, then $$Q = \begin{bmatrix} q_1 & 1 \\ q_2 & 1 \\ q_3 & 1 \end{bmatrix} \quad (9.2)$$

Accordingly, the points (q, v) forming normalized quantile plot 612 are selected with abscissae, q, an ordinate, $v_{norm}$ (q, $v_{norm}$). In some embodiments, normalized quantile plot 612 is any linear regression or approximation over the set of points having ordinate q and abscissae, v, in chart 600B.

Note, for example, that the right tail of the distribution (+Q) is "heavier" than a normal distribution (plot 603 is above plot 612 on the right hand side of chart 600B). Without limitation, a distribution is "heavier" (meaning having more extreme values) if the right side is larger or left side is smaller, "lighter" if the right side is smaller or left side is larger. And the left tail of the distribution (-Q) is lighter than a normal distribution.

Plots 603 that are close to a normal distributions may be referred to as "linear outputs" because of the rectilinear shape of plot 612. Accordingly, in some embodiments (e.g., for the output current of an operational amplifier) the output may be a somewhat linear output. Note that the specific shape of plot 603 depends not only on the IC design, but also on the specification, v, that is being plotted.

Figure 7B:
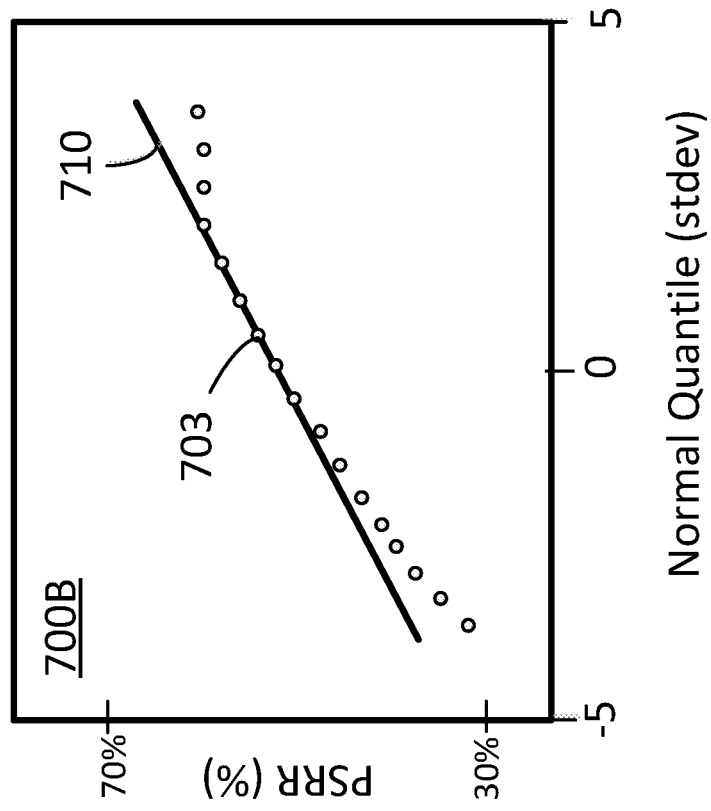
FIGS. 7A-B illustrate a full probability distribution and a quantile plot of a power supply rejection ratio (PSRR) in the IC design of FIGS. 5A-B and FIGS. 6A-B, according to some embodiments.
Figure 7A:
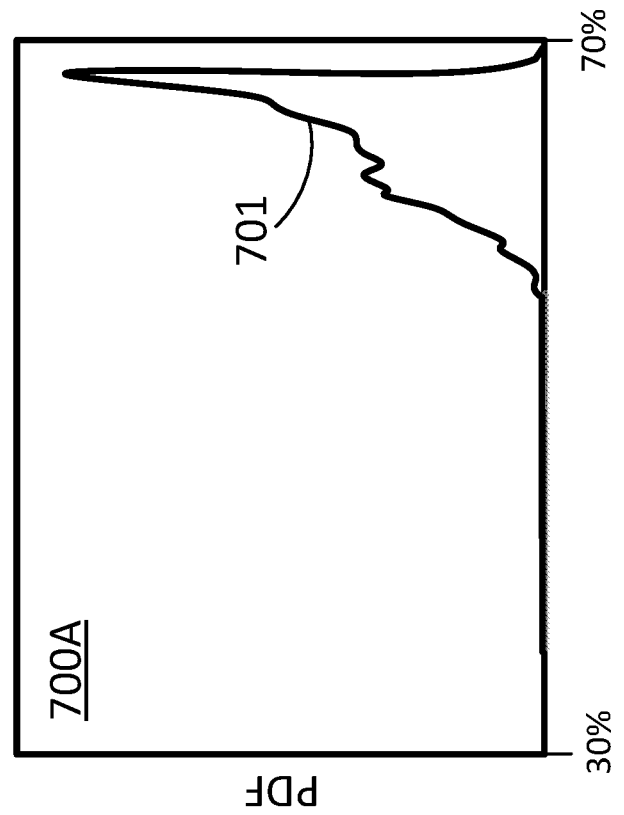

FIGS. 7A-B illustrate chart 700A with a full PDF 701 and chart 700B with a quantile plot 703 of a power supply rejection ratio (PSRR, in %) in the IC design of FIGS. 5A-B and FIGS. 6A-B (e.g., an operational amplifier at a 45 nm technology node), according to some embodiments. The PSRR is the ability of an amplifier to maintain its output voltage as its DC power-supply voltage is varied, e.g., the ability of the amplifier to reject or suppress fluctuations in its power supply value relative to its output voltage. Accordingly, it is desirable for an IC design of an operational amplifier to have a larger value of PSRR. A linear plot 710 in chart 700B corresponds to the normal distribution. In chart 700B, points on the negative side, -Q, are mostly near normal distribution in plot 710, with tail values heavier than normal, e.g., the PSRR values are "sublinear," or less than normal distribution in plot 710, as a function of the quantile value) at around Q=-2. The right end of plot 703 (e.g., on the +Q side) is short and almost cut off at around Q=+2.

Figure 8:
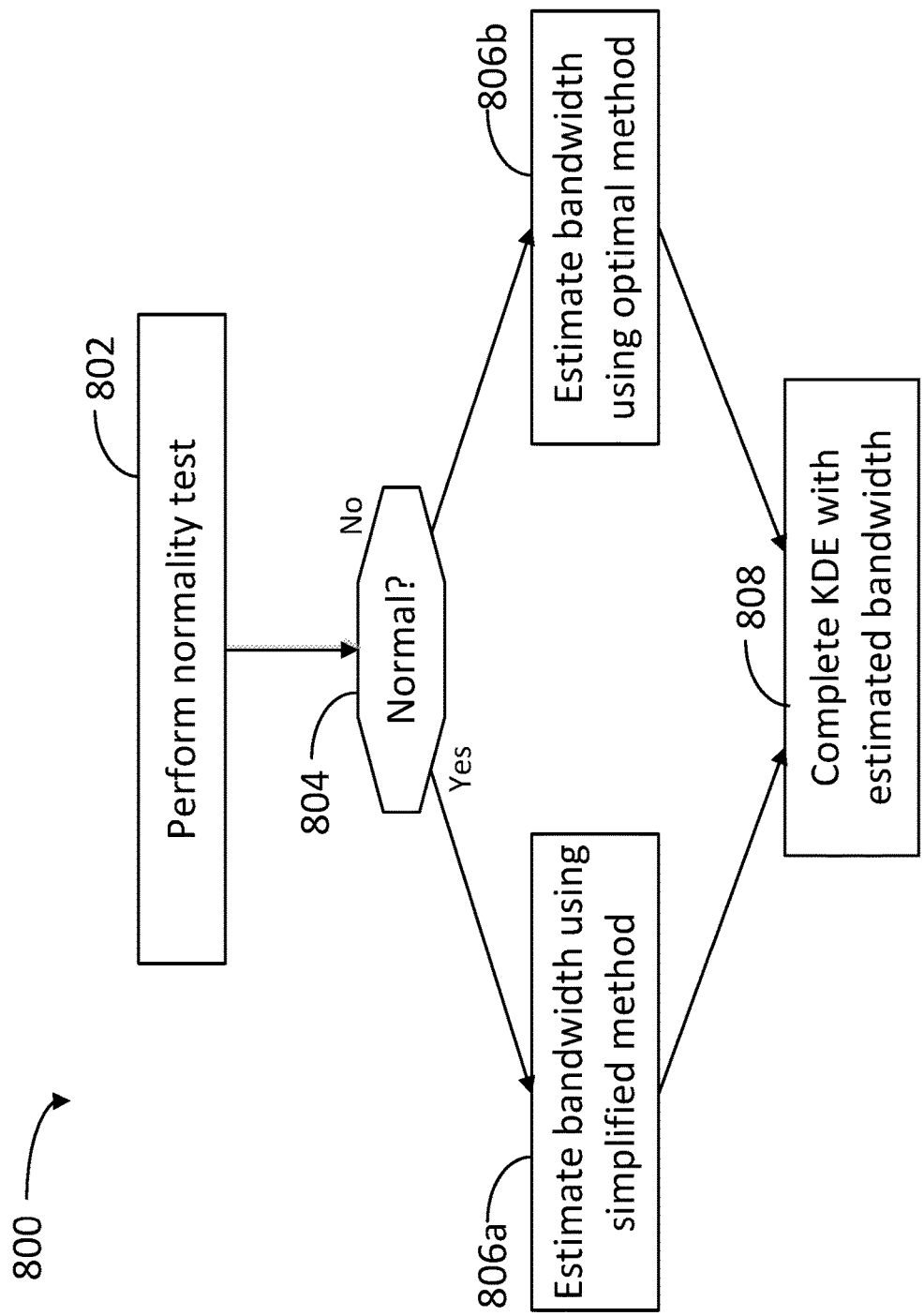
FIG. 8 is a flowchart illustrating steps in a method to obtain a kernel density distribution for circuit performance, according to some embodiments.

FIG. 8 is a flowchart illustrating steps in a method 800 to obtain a KDE for circuit performance, according to some embodiments. At least some of the steps in method 800 may be performed by a computer having a processor executing commands stored in a memory of the computer. Further, steps as disclosed in method 800 may include retrieving, editing, and/or storing files in a database that is part of, or is communicably coupled to, the computer. Methods consistent with the present disclosure may include at least some, but not all of the steps illustrated in method 800, performed in a different sequence. Furthermore, methods consistent with the present disclosure may include at least two or more steps as in method 800, performed overlapping in time, or almost simultaneously.

In some embodiments, at least one or more of the steps in method 800 may be performed in a cloud computing environment, wherein a computer may include servers, such as a master server and a slave server. Accordingly, at least some of the steps illustrated in method 800 may be performed in parallel in different processors, following separate computational threads. For example, each of the separate computational threads may be performed by at least one of slave servers in each of multiple applications and processors dedicated to the specific computational thread.

In some embodiments, method 800 includes performing MC simulations (e.g., in the context of an SSS technique), to obtain specification values $\{v\}_i$ from a set of N samples $\{x\}_i$ and to determine a KDE distribution (e.g., curve 410, cf. Eqs. 5-6).

Step 802 includes performing a normality test on the KDE distribution to determine how close is the KDE distribution to a normal distribution. In some embodiments, step 702 may include performing a number of normality tests such as Kolmogorov-Smirnov test, Jarque-Bera test, and the like.

Step 804 includes evaluating whether the KDE distribution passes or fails the normality test, according to a fail criterion. When step 804 determines that the KDE distribution passes the normality test, step 806a may include a fast and simple procedure for estimating a bandwidth of the KDE distribution using the following expression $$h = \left(\frac{4}{3N}\right)^{1/5} \cdot MAD(\vec{v})/0.6745 \tag{10.1}$$

$MAD(v)/0.6745$ is a robust estimate (resistant to outliers) of sample standard deviation, MAD is median absolute deviation:

$$MAD(\vec{v}) = \text{median}|\vec{v} - \text{median}(\vec{v})| \tag{10.2}$$

A statistical distribution of circuit performance as a function of specification, v, may be close to a Normal distribution for many IC designs, but in some instances this is not the case.

Step 806b includes estimating the bandwidth of the KDE distribution using a more accurate, yet somewhat more complex method, when step 804 determines that the KDE distribution fails the normality test. Accordingly, step 806b may include forming a function, R(f''), to use in Eq. 8, the function R(f'') defined as $$R(f'') \approx \frac{1}{N^2 h^5} \sum_{i=1}^{N} \sum_{j=1}^{N} K^{(4)}\left(\frac{v_i - v_j}{h_2}\right) \tag{11}$$

wherein the values $v_{i,j}$ are selected from the set $\{v_i\}$ (i, and j, being dummy indices running from 1 to N), and $K^{(4)}$ is the fourth-order derivative of the KDE distribution (cf. Eq. 6).

Step 806b may include an iterative process wherein a new KDE distribution has a bandwidth, $h_2$, whose optimal value may be estimated, inter-alia, from the sixth-order derivative of the KDE distribution ($K^{(6)}$). This process repeats for several iterations, wherein in step "k" a new value $h_{k+1}$ (in the left hand side of Eq. 8) is obtained from a current value $h_k$ (used in the right hand side of Eq. 8), until a convergence criterion is reached (e.g., the value of, $|h_{k+1} - h_k|$, is less than a selected threshold). In some embodiments, the convergence criterion may include stopping the iteration at step k, when $h_k$ is validated with a Normality test (cf. step 804). In some embodiments, it is expected that the total number of iterations in step 806b may scale as the square of the number of MC samples (e.g., $O(N^2)$).

Step 808 includes completing the KDE distribution model using the estimated bandwidth, h (e.g., in Eqs. 5-6).

Figure 9:
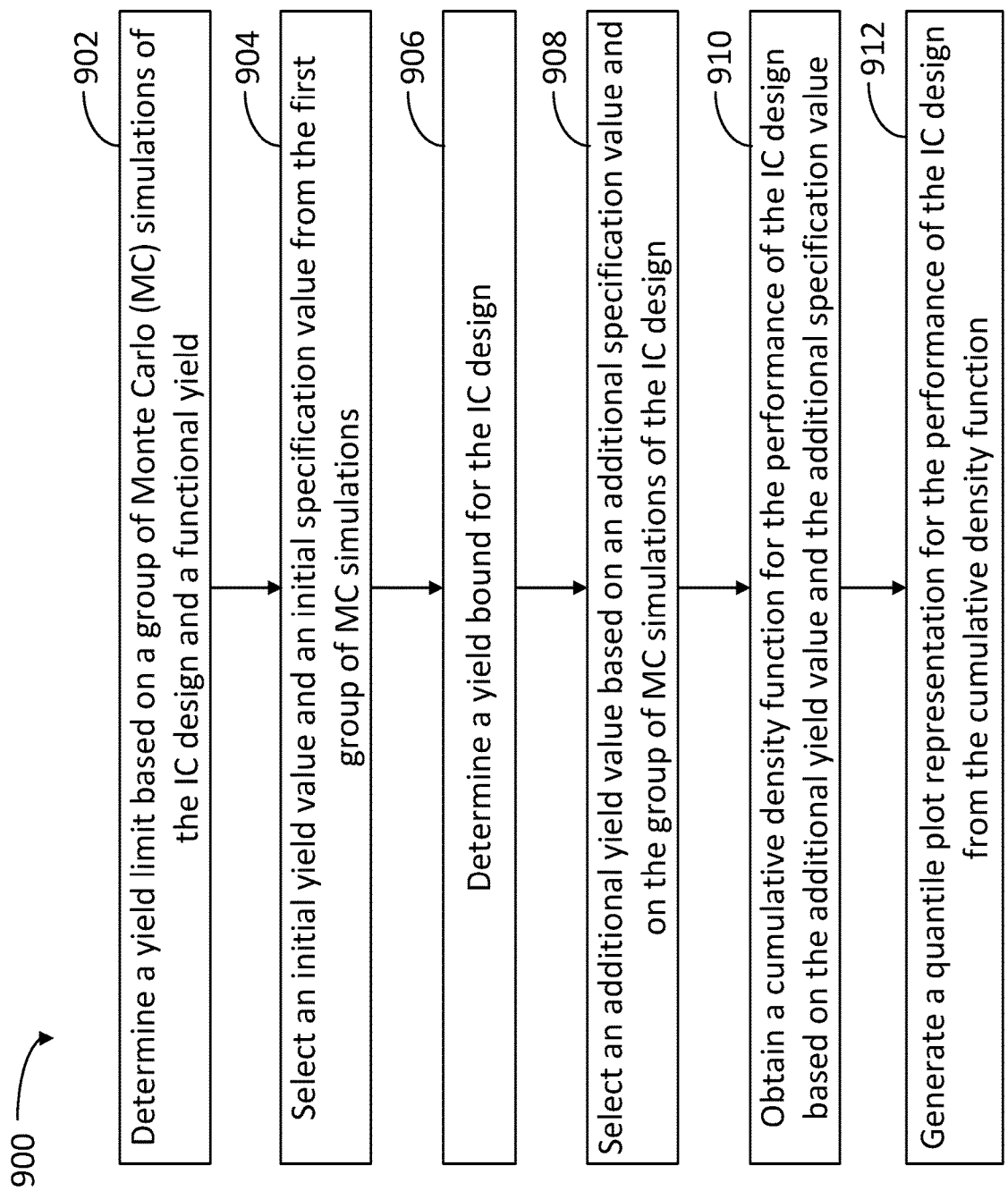
FIG. 9 is a flowchart illustrating steps in a method to obtain a quantile plot of a circuit performance, according to some embodiments.

FIG. 9 is a flowchart illustrating steps in a method 900 to obtain a quantile plot of a circuit performance, according to some embodiments. At least some of the steps in method 900 may be performed by a computer having a processor executing commands stored in a memory of the computer. Further, steps as disclosed in method 900 may include retrieving, editing, and/or storing files in a database that is part of, or is communicably coupled to, the computer. Methods consistent with the present disclosure may include at least some, but not all of the steps illustrated in method 900, performed in a different sequence. Furthermore, methods consistent with the present disclosure may include at least two or more steps as in method 900, performed overlapping in time, or almost simultaneously.

In some embodiments, at least one or more of the steps in method 900 may be performed in a cloud computing environment, wherein a computer may include servers, such as a master server and a slave server. Accordingly, at least some of the steps illustrated in method 900 may be performed in parallel in different processors, following separate computational threads. For example, each of the separate computational threads may be performed by at least one of slave servers in each of multiple applications and processors dedicated to the specific computational thread.

In some embodiments, method 900 includes forming a map including plots with points (y, v), where the ordinate is a yield measure, e.g., CDF, as in plots 502 and 602, and the abscissae are the associated specification values (e.g., current, power supply rejection ratio, and the like). Accordingly, given a point (y, v) in the map, the IC design is expected to have a yield, y, when the yield condition is that the specification of the manufactured IC be greater than, v (or lesser than, depending on the parameter condition). Using a KDE estimation technique as in method 800 above is convenient when the specification values, v, are within one sigma or two sigma from the mean value $<v>$. However, in some embodiments it may be desirable to obtain an accurate set of points (y, v) when the values of v are far removed from the mean resulting from a MC simulation of the IC design (e.g., with a scaling factor, s=1). In some embodiments, method 900 achieves this by suitably implementing an SSS technique to include high yield points (e.g., points with v values well beyond 2 or 3 standard deviations from the mean).

Step 902 includes determining a yield limit, $y_{limit}$, based on a group of MC simulations of the IC design, and on a functional yield, $y_f$. In some embodiments, step 902 may include determining an upper limit of the yield, $y_{limit}$, such that a user is not interested in yield values beyond $y_{limit}$. In some embodiments, step 902 may include selecting an upper value for the yield to be 6 (six), in normalized quantile units (e.g., CDF 99.99966%). In some embodiments, step 902 may include receiving from the user the upper value for the yield, $y_{limit}$. In some embodiments, step 902 includes verifying whether the IC design has a "functional" yield, $y_f$. The functional yield, $y_f$, is an upper limit of the yield that the IC design is able to achieve regardless of the value of the specification value, v. When $y_f$ exists, step 902 includes inserting a boundary point ($y_f$, $\infty$) into the map. In some embodiments, the boundary point may be associated with an asymptotic value less than one (1) to which a CDF curve converges.

The group of MC simulations may include a first sample set (e.g., $\{x\}i$) in an SSS technique selected with random variables having a scaling factor, s=1, and resulting in an initial specification set (e.g., $\{vi\}$).

Step 904 includes selecting an initial yield value, $y_1$, and an initial specification value, $v_1$, from the group of MC simulations. In some embodiments, $y_1$ may be selected as the maximum yield estimated by KDE (e.g., as per method 800, cf. Eqs. 5-8 and 10-11), and $v_1$ is the associated specification value (e.g., expectedly within 1 or 2 sigma from $<v>$). Accordingly, step 904 includes inserting the initial point in the map, with coordinates ($y_1$, $v_1$). In some embodiments, step 904 includes determining a current yield, $y_{current}$, and a current output, $v_{current}$, from a SSS run given a current scaling factor, $s_{current}$ (e.g., $S_{current}$=1 or any higher value). Further, step 904 may include inserting point ($y_{current}$, $v_{current}$) into the map, when $y_{current}>y_1$.

Step 906 includes determining a yield bound for the IC design. In some embodiments, step 906 may include finding, within existing SSS results, the largest yield value, $y_L$, that is smaller than $y_{limit}$ and its associated specification value, $v_L$, to form a pair ($y_L$, $v_L$). Accordingly, it is expected that $y_L$ may be found within the set of results from any of SSS iterations because at least $y_1$ (cf. step 904) is likely less than $y_{limit}$. When $y_L$ is the functional yield, then a binary search step is performed.

In some embodiments, step 906 includes finding, within the existing SSS results, the smallest yield value, $y_u$, that satisfies $y_{limit} \le y_u$, and its associated specification value, $v_u$, to form a pair ($y_u$, $v_u$). When yield value, $y_u$, is not found within the existing SSS results, step 906 may include performing further SSS results to find such a value.

Step 908 includes selecting additional yield values based on different specification values and on the group of MC simulations. In some embodiments, step 908 may include finding ($y_u$, $v_u$) pairs on each of multiple iterations, k, such that the yield value, $y_u$, is higher than any other value previously found. Further, in some embodiments, step 908 may include storing the pairs ($y_u$, $v_u$) found during the multiple iterations, even when the value $y_u$ is smaller than or equal to the greatest yield found.

Step 910 includes obtaining a CDF for the circuit performance of the IC design from the map. In some embodiments, step 910 may include performing a non-linear functional approximation to the points (y, v) in the map.

In some embodiments, step 910 includes combining low yield CDF values obtained with a KDE method and (y, v) points obtained with successive iterations of selections from the group of MC simulations using an SSS technique (e.g., for the high yield region).

Step 912 includes obtaining a quantile plot for the circuit performance of the IC design from the CDF. In some embodiments, a quantile plot facilitates the comparison of the IC design performance with a normal distribution. In some embodiments, step 912 may include doing a linear regression on the quantile plot, to obtain a normalized quantile plot (e.g., normalized quantile plot 612).

In some embodiments, step 912 may include forming a PDF of the distribution to establish the difference between the IC design and a bell-shaped normal distribution. Accordingly, step 910 may include sorting L points ($y_i$, $v_i$), where i is an integer between 1 and L (inclusive) in the map according to the yield value, $y_i$. Further, step 912 may include iterating, for multiple values, i, ranging from 1 to L, the following calculation for a value PDF($v_i$)

$$PDF(v_i) = (y_{i+1} - y_{i-1}) / (v_{i+1} - v_{i-1}) \quad (12)$$

Further, in some embodiments step 910 includes plotting the PDF distribution to allow the user a visual inspection and comparison with a normal distribution.

Figure 10:
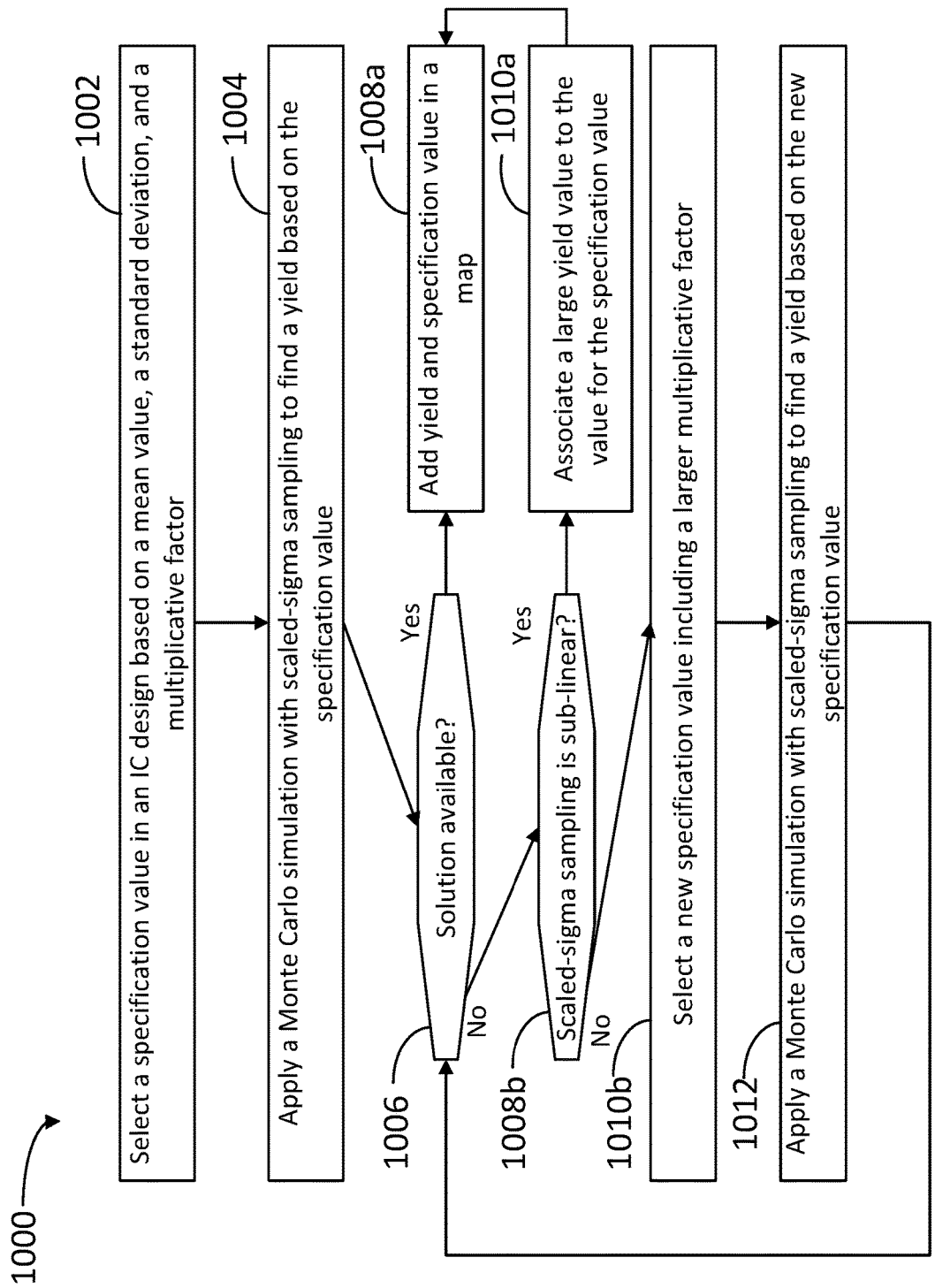
FIG. 10 is a flowchart illustrating steps in a method to obtain a point in a yield versus specification map including a yield upper bound, according to some embodiments.

FIG. 10 is a flowchart illustrating steps in a method 1000 to obtain a point in a yield (y) versus specification value (v) map including a yield upper bound ($y_u$), according to some embodiments. At least some of the steps in method 1000 may be performed by a computer having a processor executing commands stored in a memory of the computer. Further, steps as disclosed in method 1000 may include retrieving, editing, and/or storing files in a database that is part of, or is communicably coupled to, the computer. Methods consistent with the present disclosure may include at least some, but not all of the steps illustrated in method 1000, performed in a different sequence. Furthermore, methods consistent with the present disclosure may include at least two or more steps as in method 1000, performed overlapping in time, or almost simultaneously.

In some embodiments, at least one or more of the steps in method 1000 may be performed in a cloud computing environment, wherein a computer may include servers, such as a master server and a slave server. Accordingly, at least some of the steps illustrated in method 1000 may be performed in parallel in different processors, following separate computational threads. For example, each of the separate computational threads may be performed by at least one of slave servers in each of multiple applications and processors dedicated to the specific computational thread.

Step 1002 includes selecting a specification value, $v_u$, for an IC design based on a mean value, $\mu$, a standard deviation, $\sigma$, and a multiplicative factor, m, as in $$v_u = \mu + m \cdot \sigma \tag{13.1}$$

the multiplicative factor, m, may be any integer larger than 1, such as 5, 10, or even larger.

Step 1004 includes applying an MC simulation with an SSS technique to find a yield based on the specification value, $v_u$ (cf. Eq. 13.1).

Step 1006 includes determining whether a solution to the MC simulation with SSS is available. When the solution to the MC simulation with SSS is available, step 1008a includes adding the yield and specification values to the map (e.g., as a point $(y_u, v_u)$).

When the solution to the MC simulation with SSS is not available, step 1008b verifies whether the MC simulation with SSS renders a sub-linear result. For example, in some embodiments step 1008b includes verifying that the value $y_u$ renders a point $(y_u, v_u)$ below a linear regression of points already in the map (e.g., normalized quantile plot 612). When the MC simulation with SSS renders a sub-linear result according to step 1008b, step 1010a includes associating a large yield value to the specification value. In some embodiments, a large yield value may be "infinity," and step 1010a may include adding the yield and specification value in the map (cf. step 1008a).

When the MC simulation with SSS renders a super-linear result (e.g., point $(y_u, v_u)$ is above a linear regression of points already in the map) or when $y_u$, as determined in step 1004 is less than a $y_{limit}$ value (cf. method 900), step 1010b includes selecting a new specification value, $v_u$, including a larger multiplicative factor, 2m:

$$v_u = \mu + 2m \cdot \sigma \tag{13.2}$$

in some embodiments, instead of "2m," the multiplicative factor in Eq. 13 may be m', with m' being an integer such that m<m'.

Step 1012 includes applying an MC simulation with SSS to find a yield, $y_u$, based on the new specification value, $v_u$. Accordingly, in some embodiments method 1000 is repeated from step 1006 until a sufficient number of points $(y_u, v_u)$ has been included in the map.

Figure 11:
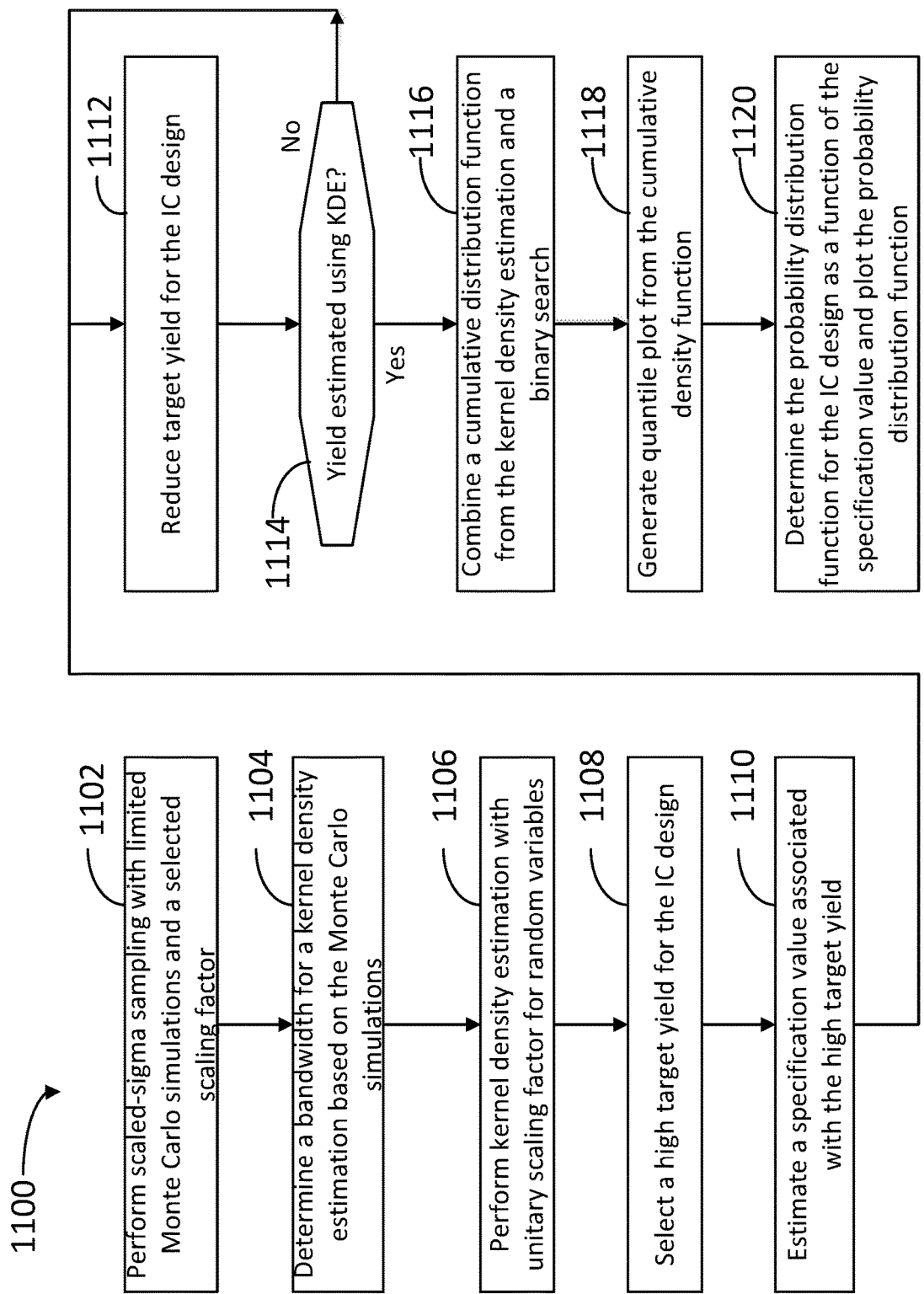
FIG. 11 is a flowchart illustrating steps in a method to visualize a full probability distribution for circuit performance, according to some embodiments.

FIG. 11 is a flowchart illustrating steps in a method 1100 to visualize a full probability distribution for circuit performance, according to some embodiments. At least some of the steps in method 1100 may be performed by a computer having a processor executing commands stored in a memory of the computer. Further, steps as disclosed in method 1100 may include retrieving, editing, and/or storing files in a database that is part of, or is communicably coupled to, the computer. Methods consistent with the present disclosure may include at least some, but not all of the steps illustrated in method 1100, performed in a different sequence. Furthermore, methods consistent with the present disclosure may include at least two or more steps as in method 1100, performed overlapping in time, or almost simultaneously.

In some embodiments, at least one or more of the steps in method 1100 may be performed in a cloud computing environment, wherein a computer may include servers, such as a master server and a slave server. Accordingly, at least some of the steps illustrated in method 1100 may be performed in parallel in different processors, following separate computational threads. For example, each of the separate computational threads may be performed by at least one of slave servers in each of multiple applications and processors dedicated to the specific computational thread.

Step 1102 includes performing a SSS with limited MC simulations and a selected scaling factor, (e.g., s cf. Eqs. 1 and 2). In some embodiments, step 1102 includes setting s=1 as the first scaling factor in the SSS technique, to produce a few hundred initial MC samples.

Step 1104 includes determining a bandwidth for a kernel density estimation using at least some of the MC calculations performed in step 1002.

These samples, combined with a good distribution estimation algorithm like Kernel Density Estimation (KDE), can reliably estimate the distribution of samples up to 2, 2.5, 3 sigma, or maybe somewhat higher. More generally, step 1104 may include finding an additional yield value with a kernel density estimation for a performance of the IC design that is lower than a few standard deviations away from a mean specification value.

Step 1106 includes performing the kernel density estimation using MC simulations with a unitary scaling factor for the random variables.

Step 1108 includes selecting a high target yield, $y_u$, for the IC design. In some embodiments, step 1108 may include selecting a yield, $y_u$, of 6 (in normalized quantile units), or even more.

Step 1110 includes estimating the specification value, $v_u$, associated with high target yield, $y_u$. In some embodiments, step 1110 includes performing a binary search to determine the specification value. In some embodiments, step 1110 includes stopping the binary search when a point $(y_u, v_u)$ has a yield, $y_u$, sufficiently close to a high yield limiting value (e.g., $y_{limit}$ in method 900). In some embodiments, step 1110 includes determining multiple points in the vicinity of $y_{limit}$ when at least one point has been found, to increase statistical accuracy.

In some embodiments, step 1110 includes performing the binary search when a lower bound (e.g., $y_L$ from method 900) to $y_{limit}$ is determined to be equal, or sufficiently close to the functional yield $y_f$. In such cases, when an absolute difference $|y_1 - y_{limit}|$ is less than an absolute difference $|y_l - y_{limit}|$, then a point $(y_{best}, v_{best}) = (y_L, v_L)$ is included in the map. Further, in some embodiments, step 1110 includes storing the point $(y_u, v_u)$ for inclusion in the map as well.

In some embodiments, a binary search in step 1110 further includes performing, one or more times, a sequence of steps including finding a specification value $vi = (v_L + v_u)/2$. Then, the binary search includes applying an SSS technique to find the yield $y_i$ corresponding to $v_i$. Further, when the SSS technique is solvable for $y_i$, then a point $(y_i, v_i)$ is included in the map, M.

When an absolute distance $|y_i - y_{limit}|$ is less than an absolute distance $|y_{best} - y_{limit}|$ (with $y_{best}$ set according to the prior step in the binary search), then the point $(y_{best}, v_{best})$ is reset as: $(y_{best}, v_{best}) = y_i, v_i)$. When $y_{best}$ is sufficiently close to $y_{limit}$ (e.g., the absolute difference $|y_{best} - y_{limit}|$ is less than a selected threshold), then the binary method is stopped.

When the value yi is greater than $y_{limit}$, when y is higher than a pre-selected threshold, or when y indicates a sub-linear behavior of the IC design at higher yield values, then a value $v_i$ is set as vu. When $y_i$ is less than or equal to $y_{limit}$, and the difference $|y_i-y_{limit}|$ is greater than or equal to the absolute distance $|y_{best}-y_{limit}|$, then the binary search sets value $v_i$ as $v_l$ and a new SSS technique is performed using specification value, $v_i$.

Step 1112 includes reducing the target yield for the IC design. In some embodiments, step 1112 may include obtaining a significant number of (y, v) points in the map, wherein the yield values, y, satisfy: $y_L<y<y_{limit}$. Accordingly, step 1112 may include performing a binary search (cf. step 1110) with the value $y_{limit}$ reduced by a selected amount, f (e.g. f=0.5 in normalized quantile units): $y_{limit}(new)=y_{limit}(old)-f$.

Accordingly, as long as $y_{limit}$ (new)>$y_L$ step 1112 may include finding a point ($y_L(new)$, $v_L$ (new)) in the map, M, such that $y_L(new)$ is the largest y smaller than $y_{limit}(new)$. Find a point ($y_u(new)$, $v_u(new)$) in the map, M, such that $y_u(new)$ is the smallest y larger than $y_{limit}(new)$. Step 1112 may include performing a binary search as in step 1110 above, using $y_{limit}(new)$, $y_L(new)$, and $y_u(new)$ as starting values.

Binary search is made much faster than repeatedly performing the algorithm in [2] by reusing the visited points in previous binary search.

Step 1114 includes determining whether the yield is estimated using a KDE. When step 1114 determines that the yield was not estimated using the KDE, method 1100 repeats from step 1110.

When step 1114 determines that the yield is estimated using the KDE, step 1116 includes combining a CDF from the KDE and a binary search.

Step 1118 includes generating a quantile plot using the CDF.

Step 1120 includes determining a PDF from the CDF as a function of the specification value for the IC design, and plotting the PDF. In some embodiments, step 1120 includes displaying the PDF plot, a CDF plot, and a quantile plot for the IC design, in a computer display, for a user.

Finally, plots are generated based on KDE and all visited points in binary search.

Figure 12:
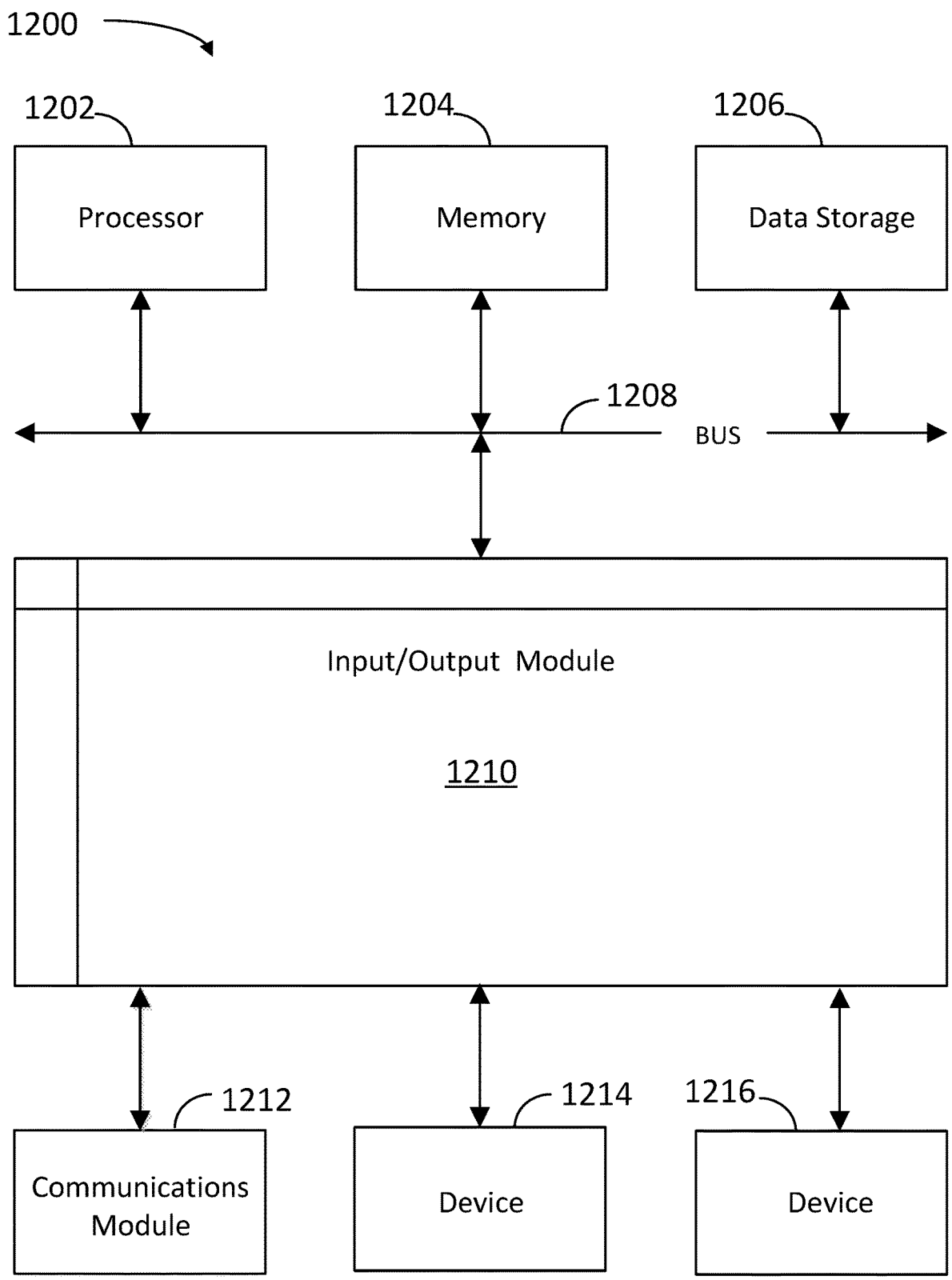
FIG. 12 is a block diagram illustrating an example computer system, according to some embodiments.

FIG. 12 is a block diagram illustrating an example computer system 1200 with which the methods and steps illustrated in FIGS. 8-11 can be implemented, according to some embodiments. In certain aspects, computer system 1200 can be implemented using hardware or a combination of software and hardware, either in a dedicated server, integrated into another entity, or distributed across multiple entities.

Computer system 1200 includes a bus 1208 or other communication mechanism for communicating information, and a processor 1202 coupled with bus 1208 for processing information. By way of example, computer system 1200 can be implemented with one or more processors 1202. Processor 1202 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 1202 may include modules and circuits configured as a 'placing' tool or engine, or a 'routing' tool or engine, to place devices and route channels in a circuit layout, respectively and as disclosed herein.

Computer system 1200 includes, in addition to hardware, code that creates an execution environment for the computer program in question, e.g., code that constitutes processor firmware, a protocol stack, a database management system, an operating system, or a combination of one or more of them stored in an included memory 1204, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. Processor 1202 and memory 1204 can be supplemented by, or incorporated in, special purpose logic circuitry.

The instructions may be stored in memory 1204 and implemented in one or more computer program products, e.g., one or more modules of computer program instructions encoded on a computer readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis languages, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions.

Computer system 1200 is coupled via input/output module 1210 to various devices. The input/output module 1210 is any input/output module. Example input/output modules 1210 include data ports such as USB ports. The input/output module 1210 is configured to connect to a communications module 1212. Example communications modules 1212 include networking interface cards, such as Ethernet cards and modems. In certain aspects, the input/output module 1210 is configured to connect to a plurality of devices, such as an input device 1214 and/or an output device 1216. Example input devices 1214 include a keyboard and a pointing device, e.g., a mouse or a trackball, by which a user can provide input to the computer system 1200. Other kinds of input devices 1214 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as a LED (light emitting diode), CRT (cathode ray tube), or LCD (liquid crystal display) screen, for displaying information to the user.

Methods as disclosed herein may be performed by computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein (e.g., as in methods 800, 900, 1000 and 1100). One or more processors in a multi-processing arrangement may also be employed to execute the sequences of instructions contained in memory 1204. In alternative aspects, hard-wired circuitry may be used in place of, or in combination with, software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 1200 includes servers and personal computer devices. A personal computing device and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 1202 for execution. Such a medium may take many forms, including, but not limited to, non-volatile media, volatile media, and transmission media. Non-volatile media include, for example, optical disks, magnetic disks, or flash memory, such as data storage device 1206. Volatile media include dynamic memory, such as memory 1204. Transmission media include coaxial cables, copper wire, and fiber optics, including the wires that comprise bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or "the like" is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method for visualizing a performance distribution of an integrated circuit (IC) design, comprising:
    determining a yield limit based on a group of Monte Carlo simulations of the IC design;
    selecting a first yield value based on a first specification value from the group of Monte Carlo simulations;
    selecting a second yield value based on a second specification value and on the group of Monte Carlo simulations of the IC design, wherein the second yield value is larger than the first yield value and lower than the yield limit;
    obtaining a cumulative density function for a performance of the IC design based on the second yield value and the second specification value; and
    generating a quantile representation for the performance of the IC design from the cumulative density function.

2. The computer-implemented method of claim 1, wherein selecting the second yield value based on the second specification value comprises finding the second yield value with a kernel density estimation for a performance of the IC design that is lower than a few standard deviations away from a mean specification value.

3. The computer-implemented method of claim 1, wherein selecting the second yield value based on the second specification value comprises finding the second yield value using a binary search, and verifying that the second yield value is lower than a user-specified limit.

4. The computer-implemented method of claim 1, wherein determining the yield limit based on the group of Monte Carlo simulations comprises:
   determining a kernel density estimation for a statistical distribution for the performance of the IC design as a function of a specification value,
   selecting a bandwidth for the kernel density estimation based on a standard deviation of the specification value obtained from the group of Monte Carlo simulations, and
   finding a specification value associated with a largest yield obtained for the group of Monte Carlo simulations.

5. The computer-implemented method of claim 1, wherein selecting the second yield value comprises:
   obtaining multiple yield values from the group of Monte Carlo simulations and using the second specification value as a performance qualifier,
   fitting the multiple yield values to a model, and
   obtaining the second yield value by setting a scaling parameter in the model equal to unity.

6. The computer-implemented method of claim 1, wherein selecting the second yield value comprises selecting from the group of Monte Carlo simulations a yield value associated with a specification value that is multiple standard deviations separated from an average specification value, the average specification value obtained from the group of Monte Carlo simulations.

7. The computer-implemented method of claim 1, wherein generating a quantile representation for the performance of the IC design from the cumulative density function comprises:
   determining a normalized quantile prediction for the performance of the IC design as a linear regression of the cumulative density function; and
   plotting the normalized quantile prediction together with the quantile representation for the performance of the IC design.

8. The computer-implemented method of claim 1, further comprising determining a probability distribution function for the IC design as a function of a specification value from the cumulative density function.

9. The computer-implemented method of claim 1, wherein selecting the second yield value and the second specification values for the IC design comprises selecting a reduced yield limit and performing a binary search for yield values that are larger than the initial yield value and lower than the reduced yield limit.

10. The computer-implemented method of claim 1, wherein selecting second yield value comprises selecting, from the group of Monte Carlo simulations to determine a yield using a specification value selected from a limit value associated with the yield limit and an upper value associate with an upper yield value that is larger than the yield limit.

11. A system, comprising:
   a memory, storing instructions; and
   at least one processor that executes the instructions to:
      determine a yield limit based on a group of Monte Carlo simulations of an IC design;
      select a first yield value based on a first specification value from the group of Monte Carlo simulations;
      select a second yield value based on a second specification value and on the group of Monte Carlo simulations of the IC design, wherein the second yield value is larger than the first yield value and lower than the yield limit;
      obtain a cumulative density function for a performance of the IC design based on the second yield value and the second specification value; and
      generate a quantile representation for the performance of the IC design from the cumulative density function.

12. The system of claim 11, wherein to select the second yield value based on the second specification value, the at least one processor executes instructions to find the second yield value with a kernel density estimation for a performance of the IC design that is lower than a few standard deviations away from a mean specification value.

13. The system of claim 11, wherein to determine the yield limit based on the group of Monte Carlo simulations the at least one processor further executes instructions to:
   determine a kernel density estimation for a statistical distribution for the performance of the IC design as a function of a specification value,
   select a bandwidth for the kernel density estimation based on a standard deviation of the specification value obtained from the group of Monte Carlo simulations, and
   find a specification value associated with a largest yield obtained for the group of Monte Carlo simulations.

14. The system of claim 11, wherein to select the second yield value the at least one processor further executes instructions to:
   obtain multiple yield values from the group of Monte Carlo simulations using multiple scaling factors and using the second specification value as a performance qualifier,
   fit the multiple yield values to a model, and
   obtain the second yield values by setting a scaling parameter in the model equal to unity.

15. The system of claim 11, wherein to select the second yield value the at least one processor further executes instructions to select at least one second yield value that is higher than the first yield value.

16. The system of claim 11, wherein to select the second yield value the at least one processor further executes instructions to select from the group of Monte Carlo simulations a yield value associated with a specification value that is multiple standard deviations separated from an average specification value, the average specification value obtained from the group of Monte Carlo simulations.

17. The system of claim 11, wherein to generate a quantile representation for the performance of the IC design from the cumulative density function the at least one processor further executes instructions to:
   determine a normalized quantile prediction for the performance of the IC design as a linear regression of the cumulative density function; and
   plot the normalized quantile prediction together with the quantile representation for the performance of the IC design.

18. A non-transitory, machine-readable medium comprising instructions stored in a memory which, when executed by a processor cause a computer to perform a method, the method comprising:
- determining a yield limit based on a group of Monte Carlo simulations of an IC design;
- selecting a first yield value based on a first specification value from the group of Monte Carlo simulations;
- selecting a second yield value based on a second specification value and on the group of Monte Carlo simulations of the IC design, wherein the second yield value is larger than the yield value and lower than the yield limit;
- obtaining a cumulative density function for a performance of the IC design based on the second yield value and the second specification value; and
- generating a quantile representation for the performance of the IC design from the cumulative density function.

19. The non-transitory, machine-readable medium of claim 18, wherein selecting the second yield value based on the second specification value comprises finding the second yield value with a kernel density estimation for a performance of the IC design that is lower than two standard deviations away from a mean specification value.

20. The non-transitory, machine-readable medium of claim 18, wherein determining the yield limit based on the group of Monte Carlo simulations comprises:
- determining a kernel density estimation for a statistical distribution for the performance of the IC design as a function of a specification value,
- selecting a bandwidth for the kernel density estimation based on a standard deviation of the specification value obtained from the group of Monte Carlo simulations, and
- finding a specification value associated with a largest yield obtained from the group of Monte Carlo simulations.

* * * * *